Jan. 9, 1951                   J. MIHALYI                   2,537,905
SPEED ADJUSTING MECHANISM FOR DISK TYPE CAMERA SHUTTERS
Filed July 8, 1949
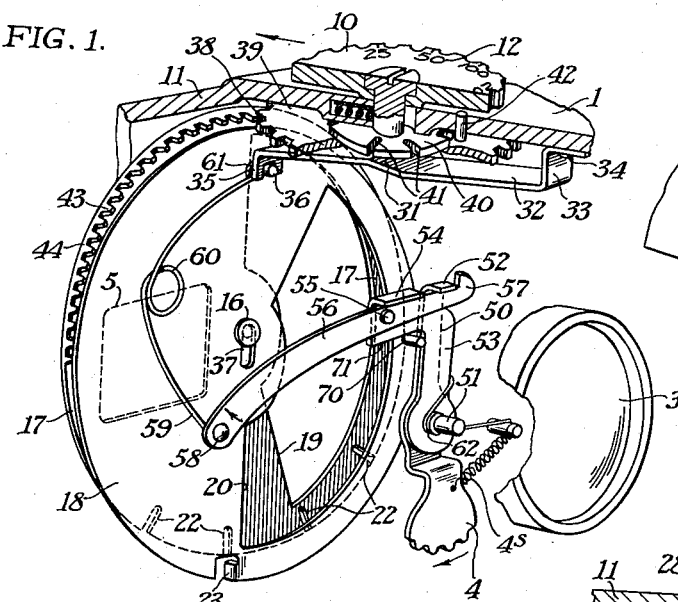
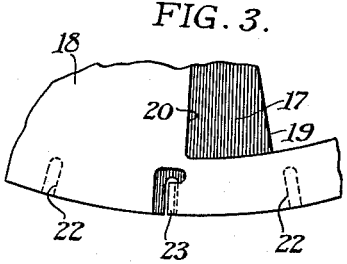
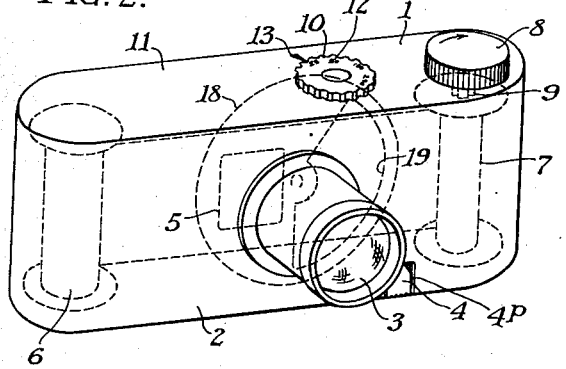
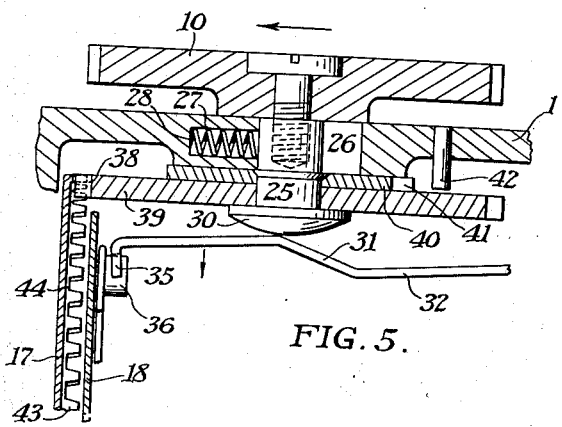
JOSEPH MIHALYI
INVENTOR
BY
ATTORNEYS Patented Jan. 9, 1951

2,537,905

UNITED STATES PATENT OFFICE 2,537,905

SPEED ADJUSTING MECHANISM FOR DISK TYPE CAMERA SHUTTERS

Joseph Mihalyi, Rochester, N. Y., assignor to Eastman Kodak Company, Rochester, N. Y., a corporation of New Jersey Application July 8, 1949, Serial No. 103,707

15 Claims. (Cl. 95—59)

This invention relates to photography and more particularly to inexpensive variable speed camera shutters. One object of my invention is to provide a shutter exposure adjusting mechanism by which exposures of various durations can be obtained. Another object of my invention is to provide a variable speed shutter mechanism suitable for shutters of the type in which shutter disks move across an exposure aperture to open and then close the aperture. A still further object of my invention is to provide a shutter exposure adjusting mechanism by which the effective width of a slot between two shutter disks can be readily altered at will. A still further object of my invention is to provide a suitable means for holding two shutter disks together with a fixed slot between them, and to move one shutter disk relative to the other for varying the width of the slot. Other objects will appear from the following specification, the novel features being particularly pointed out in the claims at the end thereof.

Disk-type shutters have the advantage of being both inexpensive and reliable, but it has not always been a simple matter to so arrange two disk shutters as to be able to readily adjust the effective width of an exposure slot formed by the two shutter blades. Such shutters may be used either adjacent a focal plane where comparatively small film is employed, such as 20 mm. or 35 mm. film, for instance; or such shutters may be used adjacent the camera objective in the more usual manner. The shutter exposure adjusting mechanism of the present invention is particularly adapted for use with a shutter having a driving mechanism of the type disclosed in my copending application, Serial No. 79,292, for "Camera Shutter," filed March 2, 1949.

Coming now to the drawings wherein like reference characters denote like parts throughout:

Fig. 1 is an enlarged perspective fragmentary view, partially in section, showing a shutter exposure adjusting mechanism constructed in accordance with and embodying a preferred form of my invention;

Fig. 2 is a perspective view of a typical camera for using a shutter exposure adjusting mechanism of the type shown in Fig. 1;

Fig. 3 is a fragmentary detail elevation of the latch elements which normally hold the two shutter disks to rotate in unison;

Fig. 4 is a fragmentary sectional view through the shutter blades and the adjusting mechanism for varying the relationship of these blades; the blades being shown in a latched or operative position; and Fig. 5 is a fragmentary view of an enlarged scale similar to Fig. 4, but with the speed-setting member and the presser member in position for adjusting the effective width of a slot between the shutter blades to determine exposure.

Referring to Fig. 2, the present embodiment of my invention may be built into a camera body designated broadly as 1, having a front wall 2 supporting a camera objective 3. A trigger 4 may be mounted on the front wall 2, the function of this trigger being to release the shutter to make an exposure. The camera may include an exposure frame 5 lying behind and coaxial with the objective 3. Film may be moved from a supply spool 6 to a take-up spool 7 past the exposure frame 5 in the usual manner, a film-winding knob 8 being adapted to turn the spool 7 through a winding key 9. A speed-setting member 10 is indicated as being mounted on one wall 11 of the camera so that by bringing one of the graduations 12 opposite a pointer 13 on the camera, the speed of an exposure may be determined.

The shutter mechanism may be similar to that shown in my above-mentioned copending application, insofar as the means for driving the shutter past the exposure aperture goes, although it differs from the above-mentioned application in that instead of providing a single shutter blade (which is all that is necessary for a single exposure of predetermined time), I utilize a pair of shutter blades.

In the present embodiment, the shutter may consist of a support 15 which may carry a stud 16 on which two disk-type shutter blades are mounted; one blade 17 being mounted to turn on the stud 16 and the other blade 18 being mounted to turn and also slide on the stud 16. In the operation of the shutter, the disks 17 and 18 turn together as a unit, and in this operative position they are latched together.

The shutter blade 17 is provided with an arcuate slot 19 and the shutter blade 18 is provided with an arcuate slot 20 so that the degree of overlap of these two slots determines the length of an exposure because the shutter blade is always driven at the same speed.

In order to latch the shutter blades 17 and 18 together, shutter blade 17 is provided with a series of slots 22 which, in this instance, may be formed on the periphery of the shutter plate. These slots are spaced predetermined distances apart and are adapted to receive a lug 23 formed on the periphery of shutter blade 18. Thus, when the shutter blades are in the Fig. 4 position with the lug 23 lying in a slot 22, the latch elements 22—23 hold the plates with the slots 19 and 20 having the desired overlap so that when the shutter blades are driven through a revolution, the effective width of the slot will cross the exposure aperture 5, thus making an exposure.

In order to adjust the width of the slot, the mechanism best shown in Figs. 4 and 5 is employed. As herein shown, there is a speed setting member in the form of a disk having the graduations 12 thereon; these graduations being adapted to be registered with a pointer 13 on the camera body to indicate the exposure. The speed setting member 10 is attached to a shaft 25 which is mounted to slide in a slot 26 formed in the top wall 11. A spring 27 lying in an aperture 28 normally thrusts the shaft 25 to one end of the slot 26 and into an inoperative position, as shown in Fig. 4. This is the position which these parts assume while an exposure is being made, and, unless the exposure is to be altered, they remain in this inoperative position. If it is desired to alter the exposure, the speed setting member is moved in the direction shown by the arrow in Fig. 5 until the stud 25 reaches the end of the slot 26, at which time two things will have occurred. The stud 25 has a rounded head 30 which engages a cam 31 carried on a presser member 32; this presser member being formed upwardly at 33, as shown in Fig. 1, and being attached to the camera wall 1 as by means of one or more rivets 34. When the stud head 30 engages the cam 31 and the stud is moved to the Fig. 5 position, the presser member 32 moves downwardly, as shown in Fig. 5, so that the forked end 35, best shown in Fig. 1, may engage the driving pin 36 carried by the shutter blade 18. When the forked member 35 first engages the pin 36, it locks the shutter blade 18 against turning and continued movement of the stud 25 until it rides completely up the cam 31, causes further downward movement of the forked pin 35 so that the shutter blade 18 is moved downwardly on the stud 16, which movement can occur because of the elongated slot 37 which permits the sliding movement on the stud 16. This downward movement moves the latching lug 23 out of a latching notch 22 in the shutter blade 17 and, consequently, the shutter blade 17 is now free to move except that, as this release occurs, one of the teeth 38 on a gear 39, staked on the stud 25, meshes with one of the teeth 43 of the gear segment 44 carried by the shutter blade 17. Thus, the shutter blade is now engaged with the gear 39 so that any rotative movement of the setting member 10 may turn the shutter blade 17 relative to shutter blade 18 to adjust the slot between these members.

It is, of course, necessary to now latch the blades 17 and 18 together, and it is therefore necessary to register the latching lug 23 with a latching slot 22 of blade 17. To accomplish this, I provide an indexing device consisting of a plate 40 attached to the shaft 25 to turn with the shaft. This plate has a series of slots 41 spaced about its periphery, and these slots are angularly located so that each time one of these slots engages a downwardly extending pin 42, carried by the camera wall 1, the latching lug 23 can be engaged with a slot 22. In other words, the angular spacing of the slots 22 and 41 are adjusted relative to each other, so that when the spring 27 moves the stud 25 to the right, from the position shown in Fig. 5, toward the position shown in Fig. 4, the gear 39 can only be unmeshed from the gear segment 40 when a slot 41 slides about the pin 42. When this can be done, the blades 17 and 18 are so located that the lug 23 may engage its latching counterpart 22 as the blade 18 moves upwardly through spring 60 tending to move the ends 58 and 61 apart as the stud 30 moves on the cam 31. This permits the presser member 32 to rise under the influence of the spring material of which it is made, and, finally, to release the driving pin 36. The parts will then be in their Fig. 4 position, in which position the blades are both free to rotate and from which position they may be driven to make an exposure, as disclosed in my copending application above referred to, or by other suitable and known type of driving mechanism adapted to rotate a shutter blade one revolution to make an exposure.

In the spring driving mechanism shown herein, by way of example, the shutter trigger 4 consists of a lever 50 pivoted upon a stud 51 and having a hook-shaped end 52. Pivoted on the same stud 51 is a bellcrank lever 53 having a turned-over lug 54 on one arm of the lever, and carrying a stud 55 on which lever 56 is mounted; this lever having a hook 57 at one end and a pin 58 at the other end. Pin 58 carries one end 59 of a hairpin type spring 60, the other end of which 61 encircles the driving pin 36 carried by the shutter blade 18. A spring 62 tends to turn lever 53 in a clockwise direction with respect to the pivot 51. A second spring 4ˢ is attached to trigger 4, tending to always return the trigger 4 to its rest position, here shown in Fig. 1 as resting against a stop pin 4ᴾ.

The trigger 4 may be moved in the direction shown by the arrow in Fig. 1 to initiate movement of the shutter. This swings lever 53 and lever 56 as a unit in a clockwise direction so that the end of lever 56 moves in the direction shown by the arrow, compressing and releasing the hairpin spring 60, causing the shutter blades to move as a unit. This swinging movement starts and the slot between the blades moves to cross the exposure aperture 5, but, after a limited swing of the shutter blades, the lever 56 swings about its pivot 55 releasing the hook 57 from the lug 52. When this occurs, spring 62 acts as a driving means for moving the bellcrank 53 in a counterclockwise direction, thereby again tensioning and releasing the hairpin spring 60 in a manner described in my copending application, so that movement will continue, and, when the trigger 4 is released at the end of the exposure, the lug 57 will snap over the lug 52 returning the shutter parts to their initial or starting position, and the shutter will come to rest with the pin 70 lying against the edge 71 (Fig. 1) of the bellcrank lever. While this is being accomplished, the shutter blade is rotated substantially 360 degrees. When the trigger 4 is again pressed, the shutter blades, as before, will remain stationary while the pin 70 lies against the edge 71 of the bellcrank lever arm, and, as soon as it is released by this arm moving with the trigger 4, the hairpin spring 60 may drive the blades to turn together about the pivot 16 to make an exposure. While the pin 70 is stopped by edge 71 it may pass freely under lever 56.

The operation of my improved form of shutter is extremely simple in that repeat exposures of the same duration are made with no adjustment, with the shutter blades 17 and 18 turning as a unit. When a different duration exposure is to be made, the adjusting mechanism can be moved from an inoperative position to an operative position by merely sliding the knob 10 in its bearing, and this sliding movement is the only movement that can take place when the indexing device elements—a slot 41 and pin 42—are released. When fully released, the head 30 of the stud 25 has cammed the presser member 32 downwardly to release lug 23 from a latching slot 22. The relation of the parts is such that gear teeth 38—43 become incompletely engaged before pin 42 is released from slot 41 so that shutter blade 17 cannot move unless moved by gear 39. Continued sliding movement of disk 10 completely meshes teeth 38—43 and releases pin 42 from an indexing slot 41. Thus, the shutter blade 17 is meshed with the adjusting knob while the shutter blade 18 is first latched against movement and the shutter is ready to be set for a different exposure time. The speed setting member 10 is then free to rotate while still being held in its operative position in Fig. 5 against the pressure of spring 27. By turning this knob until the required graduation is brought opposite the pointer 13, blade 17 will be rotated while blade 18 remains stationary. By releasing the knob 10, the spring 27 moves it to the right to its inoperative position of Fig. 4 in which position it is entirely disengaged from the shutter blades. If an operator should make a mistake and not register a graduation 12 with the pointer 13, the knob 10 cannot return to its inoperative position because of the pin 42 failing to pass into a slot 41. Also the teeth 38—43 cannot be disengaged. Thus, this indexing device prevents improper movement, and, if the knob does not return to its initial position, a slight turning movement will bring slot 41 into engagement with the pin 42 at which time, of course, a slot 22 is in position to be engaged by lug 23.

It will thus be seen that I have described a shutter exposure adjusting mechanism in which the several objects of this invention are achieved, and which is well adapted to meet the conditions of practical use. The device is comparatively simple and inexpensive.

As various embodiments may be readily made, and as various changes may be made in the embodiment above set forth, it is to be understood that all the matter herein set forth and shown in the accompanying drawings is to be interpreted as illustrative only and not in a limiting sense.

What I claim is:

1. A shutter exposure adjusting mechanism for use in camera shutters of the type including a pair of relatively adjustable slotted shutter blades adapted to swing past an exposure aperture to uncover and cover said aperture, a shutter trigger, and spring driving mechanism releasable by moving the trigger for swinging the shutter blades, said exposure adjusting mechanism comprising a support, a shaft on which the pair of shutter blades are mounted to turn in overlapping relationship, one shutter blade having a radially slideable connection with the shaft, a connection between the spring of the spring mechanism and the radially movable blade normally holding said blade coaxially of the other shutter blade, latch elements on one blade, a latch element on the other blade for engaging one of the latch elements on the first blade by moving one shutter blade radially on the shaft with respect to the other shutter blade, said latch elements of the blades normally engaging, a presser member for moving one shutter blade radially of the other to disengage the latch elements, and a speed adjusting member movable into operative engagement with a shutter blade for moving said blade circumferentially of the other blade to vary the opening therebetween.

2. The shutter exposure adjusting mechanism defined in claim 1 characterized by the presser member for moving one shutter blade radially of the other engaging and locking the blade against rotary movement.

3. The shutter exposure adjusting mechanism defined in claim 1 characterized by the presser member including a blade holder for engaging and holding the radially moved blade against rotative movement.

4. The shutter exposure adjusting mechanism defined in claim 1 characterized by the presser member including a blade holder consisting of a protuberance on the radially movable blade, an end on the presser member for engaging the protuberance to hold the blade against circumferential movement and to move the blade radially.

5. The shutter exposure adjusting mechanism defined in claim 1 characterized by the presser member including a blade holder consisting of a protuberance on the radially movable blade, and a protuberance engaging member on the presser member for engaging the protuberance to hold the blade against circumferential movement and to move the blade radially, said movement of the radially movable blade disengaging the latch elements normally holding the blades in fixed relationship.

6. The shutter exposure adjusting mechanism defined in claim 1 characterized by the presser member including a blade holder consisting of a protuberance on the radially movable blade, and a protuberance engaging member on the presser member for engaging the protuberance to hold the blade against circumferential movement and to move the blade radially, said movement of the radially movable blade disengaging the latch elements normally holding the blades in fixed relationship, and a movably mounted shutter speed setting member movable to and from contact with the unlatched shutter blade for moving the blade relative to the latched radially moved blade to adjust the slot between the two blades.

7. The shutter exposure adjusting mechanism defined in claim 1 characterized by the presser member including a blade holder consisting of a protuberance on the radially movable blade, and a protuberance engaging member on the presser member for engaging the protuberance to hold the blade against circumferential movement and to move the blade radially, said movement of the radially movable blade disengaging the latch elements normally holding the blades in fixed relationship, and a movably mounted shutter speed setting member movable to and from contact with the unlatched shutter blade for moving the blade relative to the latched radially moved blade to adjust the slot between the two blades, the contacting parts of the speed setting member and the shutter blade including teeth on both the speed setting member and the shutter blade positioned to mesh when the radially movable shutter blade is moved radially.

8. The shutter exposure adjusting mechanism defined in claim 1 characterized by the presser member including a blade holder consisting of a protuberance on the radially movable blade, and a protuberance engaging member on the presser member for engaging the protuberance to hold the blade against circumferential movement and to move the blade radially, said movement of the radially movable blade disengaging the latch elements normally holding the blades in fixed relationship, and a movably mounted shutter speed setting member movable to and from contact with the unlatched shutter blade for moving the blade relative to the latched radially moved blade to adjust the slot between the two blades, the contacting parts of the speed setting member and the shutter blade including teeth on both the speed setting member and the shutter blade positioned to mesh when the radially movable shutter blade is moved radially, and a spring tending to unmesh the gears when the radially movable blade moves to a position in which the two blades are latched together.

9. A shutter exposure adjusting mechanism for use in camera shutters of the type including a pair of relatively adjustable slotted shutter blades adapted to swing past an exposure aperture to uncover and cover said aperture, a shutter trigger, and spring driving mechanism releasable by moving the trigger for swinging the shutter blades, said exposure adjusting mechanism comprising a support, a shaft on which the pair of shutter blades are mounted to turn in overlapping relationship, one blade including a slot through which the shaft passes whereby said blade may be moved radially of the shaft, said spring of the driving mechanism engaging the radially movable blade and tending to hold said blade coaxially of the other shutter blade, latch elements on one blade arranged in predetermined positions, a latch element on one blade for engaging a latch element on the other blade, a latch element on one blade being disconnectable from a latch element on the other blade by moving one blade radially of the other, a pressure member for moving one blade radially of the other to release the latch elements, a speed adjusting member movable into contact with an unlatched blade, and an indexing device comprising cooperating positioning elements on the speed adjusting member on the support for regulating movement of the speed adjusting member to positions in which the latch elements of the blades may engage when the radially movable blade moves radially toward a latching position.

10. The shutter exposure adjusting mechanism defined in claim 9 characterized in that the pressure member for moving one blade radially of the other blade is also movable by the shutter speed adjusting member.

11. The shutter exposure adjusting mechanism defined in claim 9 characterized in that the movable speed adjusting member may both turn and slide on the support, the pressure member lying in the path of and being movable by the speed adjusting member.

12. The shutter exposure adjusting mechanism defined in claim 9 characterized in that the movable speed adjusting member may both turn and slide on the support, the pressure member lying in the path of and being movable by the speed adjusting member as it slides, and the shutter blade contacting with the speed adjusting member being movable relative to the other blade through turning movement of the movable speed adjusting member.

13. A shutter exposure adjusting mechanism for use in camera shutters of the type including a pair of relatively adjustable slotted shutter blades adapted to swing past an exposure aperture to uncover and cover said aperture, a shaft on which one shutter blade may turn, the other shutter blade turning on the shaft and having a connection therewith on which said blade may move radially a predetermined distance, a shutter trigger, and spring driving mechanism including a hairpin spring having ends always tending to separate connected to the radially movable blade and to the driving mechanism, and tending to hold the radially slideable blade coaxially of the blade mounted to turn on the shaft, said spring being releasable by moving the trigger for swinging the shutter blades, said exposure adjusting mechanism comprising a support, a shaft on which the pair of shutter blades are mounted to turn in overlapping relationship, latch elements on one blade, a latch element on the other blade for engaging one of the latch elements on the first blade and normally engaging one latch element, said one latch element being disengageable from a latch element on the other blade by moving the shutter blade radially, a presser member for moving one shutter blade radially of the other to disengage the latch elements, and a speed adjusting member movable into operative engagement with a shutter blade for moving said blade circumferentially of the other blade to vary the opening therebetween, an indexing mechanism on the speed adjusting mechanism for controlling the release of said mechanism from operative engagement with the shutter, said indexing mechanism including coacting parts to release said mechanism when a latch element of the shutter blade carrying latch elements is positioned to be engaged by the latch element of the other shutter blade.

14. A shutter exposure adjusting mechanism for use in camera shutters of the type including a pair of relatively adjustable slotted shutter blades adapted to swing past an exposure aperture to uncover and cover said aperture, a shaft on which one shutter blade may turn, the other shutter blade turning on the shaft and having a connection therewith on which said blade may move radially a predetermined distance, a shutter trigger, and spring driving mechanism including a hairpin spring having ends always tending to separate connected to the radially movable blade and to the driving mechanism, and tending to hold the radially slideable blade coaxially of the blade mounted to turn on the shaft, said spring being releasable by moving the trigger for swinging the shutter blades, said exposure adjusting mechanism comprising a support, a shaft on which the pair of shutter blades are mounted to turn in overlapping relationship, latch elements on one blade, a latch element on the other blade for engaging one of the latch elements on the first blade and normally engaging one latch element, said one latch element being disengageable from a latch element on the other blade by moving the shutter blade radially, a presser member for moving one shutter blade radially of the other to disengage the latch elements, and a speed adjusting member movable into operative engagement with a shutter blade for moving said blade circumferentially of the other blade to vary the opening therebetween, an indexing mechanism on the speed adjusting mechanism for controlling the release of said mechanism from operative engagement of the shutter, said indexing mechanism including coacting parts to release said mechanism when a latch element of the shutter blade carrying latch elements is positioned to be engaged by the latch element of the other shutter, both the coacting shutter blade latch elements and the indexing mechanism coacting parts comprising a plurality of slots in one member and a protuberance on the other member to enter one of the plurality of slots.

15. A shutter exposure adjusting mechanism for use in camera shutters of the type including a pair of relatively adjustable slotted shutter blades adapted to swing past an exposure aperture to uncover and cover said aperture, a shaft on which one shutter blade may turn, the other shutter blade turning on the shaft and having a connection therewith on which said blade may move radially a predetermined distance, a shutter trigger, and spring driving mechanism including a hairpin spring having ends always tending to separate connected to the radially movable blade and to the driving mechanism, and tending to hold the radially slideable blade coaxially of the blade mounted to turn on the shaft, said spring being releasable by moving the trigger for swinging the shutter blades, said exposure adjusting mechanism comprising a support, a shaft on which the pair of shutter blades are mounted to turn in overlapping relationship, latch elements on one blade, a latch element on the other blade for engaging one of the latch elements on the first blade and normally engaging one latch element, said one latch element being disengageable from a latch element on the other blade by moving the shutter blade radially, a presser member for moving one shutter blade radially of the other to disengage the latch elements, and a speed adjusting member movable into operative engagement with a shutter blade for moving said blade circumferentially of the other blade to vary the opening therebetween, an indexing mechanism on the speed adjusting mechanism for controlling the release of said mechanism from operative engagement of the shutter, said indexing mechanism including coacting parts to release said mechanism when a latch element of the shutter blade carrying latch elements is positioned to be engaged by the latch element of the other shutter, both the coacting shutter blade latch elements and the indexing mechanism coacting parts comprising a plurality of slots in one member and a protuberance on the other member to enter one of the plurality of slots, both slotted members being circular in shape and having the slots arranged about their peripheries in like angular relationship whereby both the shutter blade latch elements and the indexing coacting elements may be engaged at the same time.

JOSEPH MIHALYI.

No references cited.